United States Patent [19]

Martin et al.

[11] Patent Number: 4,919,607
[45] Date of Patent: Apr. 24, 1990

[54] ROTARY BLOW MOLDING MACHINE HAVING MOLD STATION BLOWING/NECK FINISHING MECHANISMS

[75] Inventors: M. Warren Martin, Saline; Lawrence H. Weber, Ypsilanti, both of Mich.

[73] Assignee: R & B Mchine Tool Company, Saline, Mich.

[21] Appl. No.: 252,741

[22] Filed: Oct. 3, 1988

[51] Int. Cl.⁵ .................................. B29C 49/58
[52] U.S. Cl. ............................. 425/531; 264/543; 425/535; 425/540
[58] Field of Search ............... 425/540, 537, 531, 529, 425/536, 535, 527, DIG. 5; 264/538, 543

[56] References Cited

U.S. PATENT DOCUMENTS

| | | | |
|---|---|---|---|
| Re. 25,290 | 12/1962 | Parfrey | 264/543 X |
| 2,890,483 | 6/1959 | Soubier | 425/529 X |
| 2,901,769 | 9/1959 | Sherman et al. | 425/540 X |
| 3,344,471 | 10/1967 | Martelli | 425/540 X |
| 3,531,556 | 9/1970 | Mehnert | 425/531 X |
| 3,608,135 | 9/1971 | Schurman | 425/531 |
| 3,764,250 | 10/1973 | Waterloo | 425/528 |
| 3,769,394 | 10/1973 | Latreille | 425/531 X |
| 4,047,873 | 9/1977 | Farrell | 425/523 |
| 4,187,065 | 2/1980 | Perez | 425/136 |
| 4,187,070 | 2/1980 | Martin, Jr. | 425/535 X |
| 4,213,750 | 7/1980 | Kubota et al. | 425/531 |
| 4,248,582 | 2/1981 | Martin, Jr. | 425/531 |
| 4,279,587 | 7/1981 | Martin, Jr. | 425/531 |
| 4,285,657 | 8/1981 | Ryder | 425/529 X |
| 4,439,127 | 3/1984 | Frohn | 425/155 |
| 4,497,623 | 2/1985 | Beuscher | 425/535 X |
| 4,505,664 | 3/1985 | Craig | 425/525 |
| 4,549,865 | 10/1985 | Myers | 425/540 |

*Primary Examiner*—Richard L. Chiesa
*Attorney, Agent, or Firm*—Reising, Ethington, Barnard, Perry & Milton

[57] ABSTRACT

A rotary blow molding machine includes a plurality of mold stations on a rotary carousel. Each mold station includes a pair of mold sections movable toward and away from one another to close or open the mold sections. When closed, the mold sections define a mold blowing cavity and a mold mouth communicating with the blowing cavity and opening external of the closed mold sections. A blowing/neck finishing mechanism preferably is mounted on one of the mold sections for movement between a retracted position where the blow pin is offset from the mold mouth so as not to hinder capturing of the parison in the mold station and a blowing position where the blow pin is inserted in the mold mouth. A pivotal linkage moves the blow pin in an arcuate path toward the mold mouth to insert the blow pin therein to blow a parison received in the blowing cavity and away from the mouth to extract the blow pin from the mouth after parison blowing. The pivotal linkage minimizes arcuate travel of the blow pin as it approaches and enters the mold mouth. The blow pin and mold mouth include cooperating cutting components to pinch and shear the end of the parison received in the mouth when the blow pin is inserted therein.

26 Claims, 10 Drawing Sheets

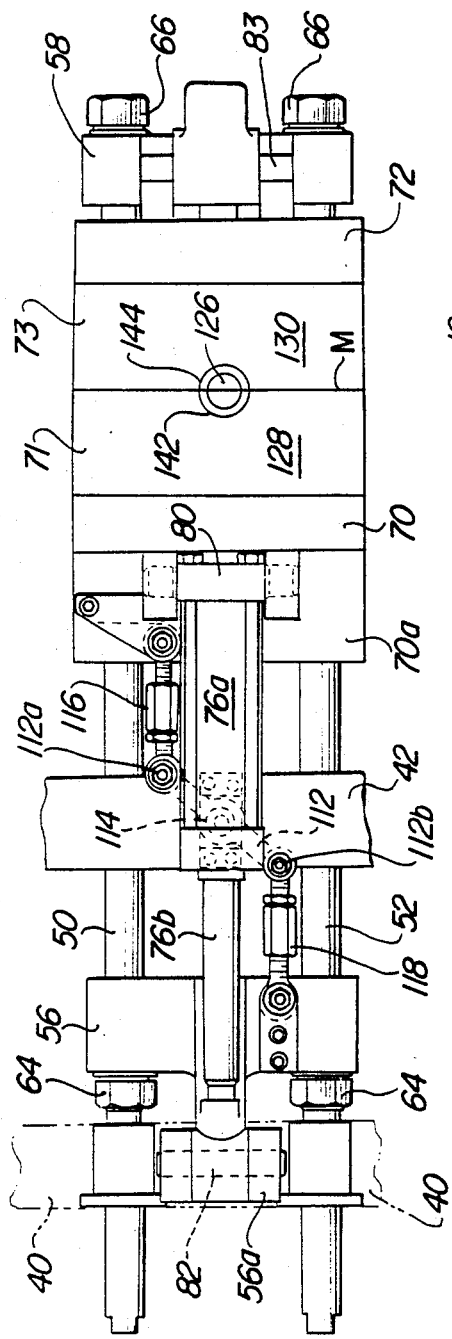

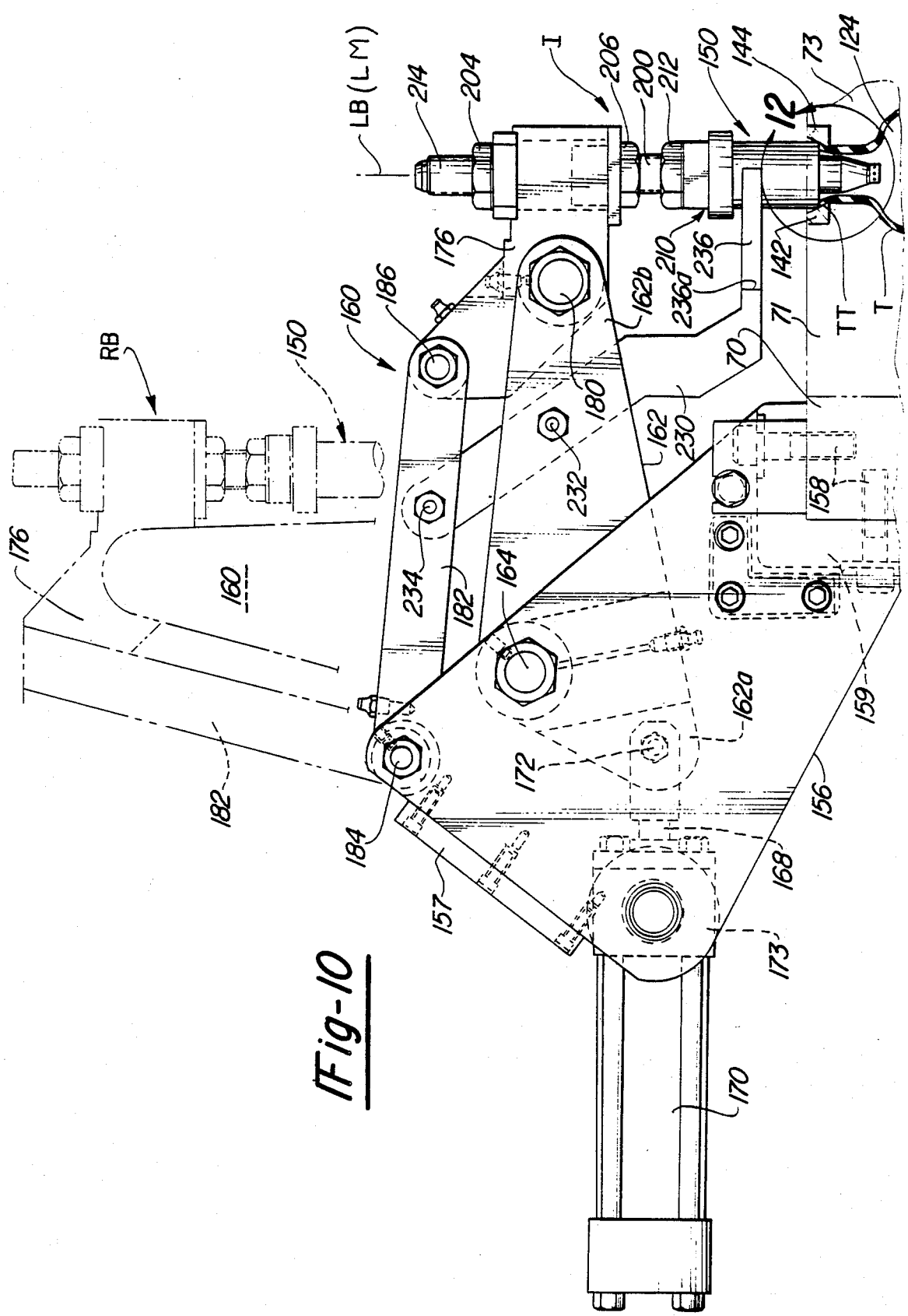

ROTARY BLOW MOLDING MACHINE HAVING MOLD STATION BLOWING/NECK FINISHING MECHANISMS

Field Of the Invention

The invention relates generally to blow molding machines and, in particular, to a rotary carousel blow molding machine having a plurality of mold stations for receiving a parison of thermoplastic resin in the form of a hollow tube and blowing the parison to desired shape at each mold station using a blowing mechanism cooperatively associated with each mold station.

BACKGROUND OF THE INVENTION

The Waterloo U.S. Pat. No. 3,764,250 issued Oct. 9, 1973 discloses a rotary carousel blow molding machine for blowing a parison to desired shape at each of a plurality of mold stations. Each mold station includes a pair of mold sections movable toward and away from one another and a fluid actuated blow needle unit carried on one of the mold sections. After the mold sections are moved toward one another to capture a parison therebetween, the fluid actuated blow needle unit inserts the blow needle through the wall of the parison transverse to the longitudinal axis thereof (i.e., transverse to the parting plane of the mold sections) to blow the parison to shape in a cavity defined between the mold sections. The mold sections are configured to accommodate and close on the fluid actuated blow needle unit as the moves toward one another and are clamped together by a clamp mechanism. Each blow needle unit is controlled by a cam unit that rotates with the rotary carousel. The blow needle punctures the side of the parison to blow same to desired shape.

The Kubota U.S. Pat. No. 4,213,750 issued July 27, 1980 describes a rotary carousel blow molding machine similar to that of Waterloo and also using a blow needle that is reciprocated transversely of the longitudinal axis of a parison held between closed mold sections to puncture the side thereof and blow the parison to shape. The blow needle is moved through a blow hole in one of the mold sections to puncture the parison.

The Craig U.S. Pat. No. 4,505,664 issued Mar. 19, 1985, describes a vertical rotary carousel blow molding machine having a plurality of mold stations thereon for blowing large size thermoplastic containers. The parison is blown successively at a plurality of mold stations to shape the parison and then to cure and cool the blown article. Each mold station includes a pair of hinged mold sections closeable toward one another to define a cavity for the article and a blow assembly that forms the bottom portion of the mold and travels with the mold sections as they are rotated by the carousel. The blow assembly is raised vertically to engage the mold sections and form the bottom of the mold station. The mold sections are moved in a horizontal plane about a vertical hinge. The blow assembly is supported on rails as it travels with the closed mold sections. Each blow assembly is engaged at different locations about the carousel axis by a respective auxiliary blowing unit at each location. The auxiliary blowing unit removes the blowing medium injected at the preceding location and injects another blowing medium for curing and/or cooling purposes. Once the article is blown, cured and cooled, the blow pins are unscrewed from the bottom of the formed article to provide threaded openings therein.

The Frohn U.S. Pat. No. 4,439,127 issued Mar. 27, 1984, discloses a blow molding machine having a stationary blowing station and an adjacent rotary turntable that includes a plurality of mold stations that capture a blown parison from a shuttle movable between the blowing station and turntable. The mold stations provide cooling and after-processing operations, such as deflashing and testing, on the captured blown parison. At the blowing station, a blow stick is inserted in the parison through a mouth between the mold sections. Following blowing, the blow stick and a keeper stick support the blown parison from opposite top and bottom ends for transfer by the shuttle to the turntable for capture by the mold sections carried thereon.

The Myers U.S. Pat. No. 4,549,865 issued Oct. 29, 1985, describes a blow molding machine having a rotary carousel with a plurality of mold stations thereon. Each mold station includes a stationary mold section mounted on the hub of carousel and a slidable mold section movable toward and away from the stationary mold section. The stationary mold section includes a blow pin thereon. Air is valved to the blow pin by an actuator located along the path of rotary travel of the mold stations.

SUMMARY OF THE INVENTION

The invention contemplates a blow molding machine having a carousel rotatably supported on a base, means for rotating the carousel, a plurality of mold stations carried on the carousel so as to be radially disposed and circumferentially spaced apart thereon and a blowing mechanism cooperatively associated with each mold station. Each mold station includes a pair of mold sections, such as mold halves, openable and closeable and defining, when closed, a blowing cavity and a mold mouth communicating with the blowing cavity and opening external of the closed mold sections. A blowing/neck finishing mechanism is cooperatively associated with each mold station. The blowing/neck finishing mechanism includes a blow pin movable between a retracted position offset from the mouth external thereof and a blowing position inserted in the mouth, means for moving the blow pin in an arcuate path between the retracted position and blowing position preferably with the longitudinal axis of the blow pin substantially parallel with the longitudinal axis of the mold mouth and means for supplying fluid pressure to the blow pin at the blowing position. The blow pin is offset from the mouth in the retracted position so as not to interfere with capturing of the parison between the mold sections.

In a preferred embodiment of the invention, the mold mouth formed by the closed mold sections and the blow pin include cooperative means for cutting a portion of the parison that is disposed in the mold mouth as the blow pin is inserted at the blowing position.

In another preferred embodiment of the invention, the blowing mechanism includes pivotal linkage means mounted on one of the mold sections and operably connected to the blow pin to move same in an arcuate path toward and away from the mold mouth with minimized arcuate travel of the blow pin as it arrives at the blowing position.

In a more preferred embodiment of the invention, the pivotal linkage means is actuated to move the blow pin in an arcuate path that includes movement of the blow pin on one side of the longitudinal axis of the mold mouth and then on an opposite side thereof as the blow pin approaches and enters the mold mouth to minimize the extent of arcuate blow pin travel at that time. The linkage means is provided with a pair of parallel pivotal links to this end.

The invention further contemplates a mold station wherein first and second mold sections are movable toward and away from one another by means providing equal and opposite movement of the mold sections for opening and closing thereof. The moving means includes elongate support means having a first mold section relatively movably disposed thereon and a second mold section affixed on the support means for movement therewith. An actuating means extends between the first mold section and the support means to move the second mold section. A synchronizer linkage means also extends between the first mold section and the support means for concurrently moving the first mold section in an equal and opposite direction to the second mold section secured on the support means when the latter is moved. The first and second mold sections are thereby movable toward one another equal amounts to clamp them together and away from one another equal amounts to open them.

BRIEF DESCRIPTION OF THE DRAWINGS

FIG. 8 is a plan view of a mold station.

FIG. 9 is a side elevational view of the mold station of FIG. 8.

FIG. 10 is a partial side elevational view of the blowing mechanism on each mold station with the mold mouth shown in section with the blow pin inserted therein for blowing a parison.

BEST MODE FOR PRACTICING THE INVENTION

Figure 1:
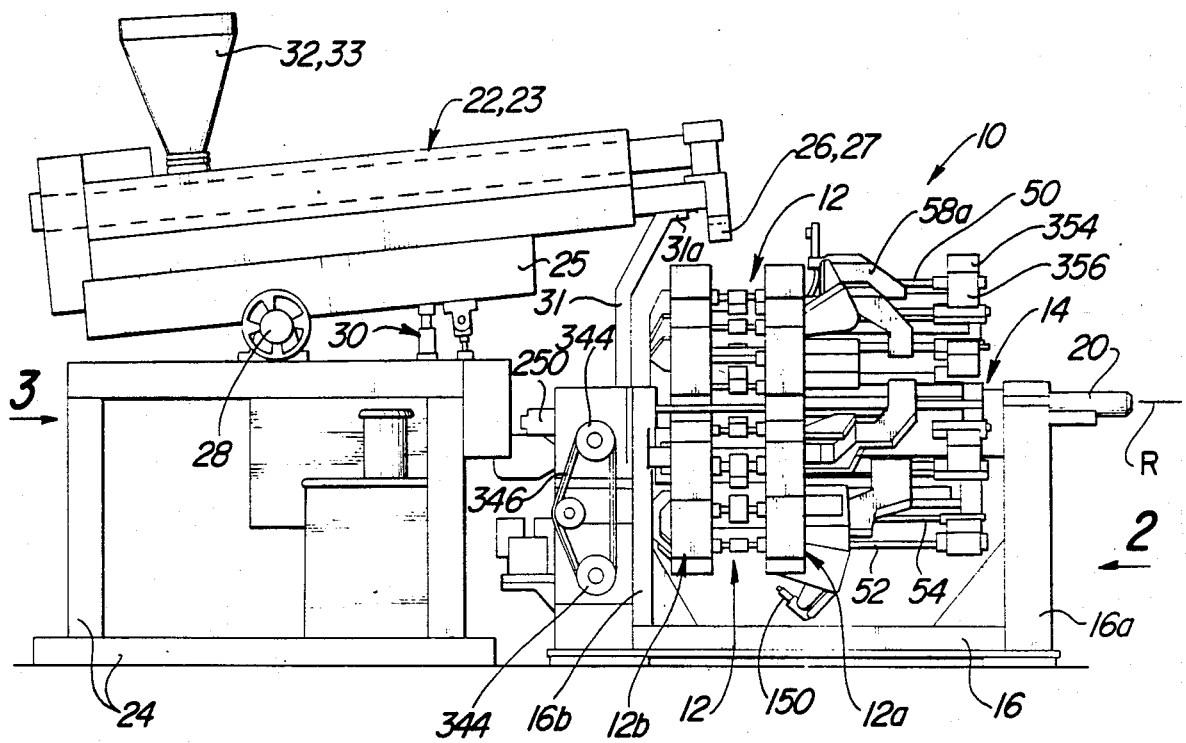
FIG. 1 is a side elevational view of a blow molding machine in accordance with the invention.

Referring initially to FIGS. 1-6, the blow molding machine 10 of the invention includes a plurality of radially disposed, circumferentially spaced mold stations 12 disposed on a rotary carousel 14. The rotary carousel 14 is rotatably supported on a machine base 16 by a carousel shaft 20. The rotary carousel 14 rotates on the base 16 about a horizontal axis R defined by the horizontal carousel shaft 20.

A pair of screw type thermoplastic material extruders 22,23 are disposed side-by-side on another base 24 such that the extruders feed thermoplastic material to an extruder head 26 that overlies the rotary carousel 14. The rotary carousel 14 is incrementally indexed to rotate the mold stations 12 relative to the extruder head 26. The extruders 22,23 are mounted on a platform 25 that is pivotally mounted on the base 24 by pivot shaft 28 so that the extruder head 26 can be rocked about the pivot shaft 28 by a cylinder/piston assembly 30 as will be explained in detail hereinbelow. An upstanding support 31 extends from the base 16 and includes a platform 31a on which a photoelectric or other eye (not shown) is disposed to determine when a parison T is initially extruded from head 26. When the eye senses the presence of the parison, a signal is sent to start operation of the blow molding machine 10. Hoppers 32,33 provide granular thermoplastic material to conventional screw type extruders 22,23.

As is well known, a tubular (cylindrical) parison T is extruded from the extruder head 26 at a parison extruding station P1 (FIG. 3) as each mold station 12 is indexed beneath the extruder head 26. The extruder head 26 may extrude a single tubular parison T or may extrude a first tubular parison and then a second tubular parison inside the first tubular parison at the parison extruding station P1.

Each mold station 12 includes a pair of mold sections or halves 12a,12b that are opened at the parison extruding station P1 beneath the extruder heads 26 and then closeable to capture the parison T extruded between the mold stations 12a,12b.

After capturing the parison T, each mold station 12 is indexed to a second angular position or station P2 of the rotary carousel 14. During indexing to the second angular position P2, the captured parison is blown to shape and then is cured during indexing from the second angular position P2 to the third, fourth and fifth angular positions P3,P4,P5 of the carousel 14. Between the fifth and sixth angular positions P5 and P6 of the carousel 14, the mold sections 12a,12a are opened and the blown article (blown parison) is removed, all as will be explained in detail hereinbelow.

The carousel shaft 20 is rotatably mounted on the upstanding, opposite ends 16a,16b of the base by bearing blocks 30 (only one shown) secured on the upstanding ends by machine screws 35. The carousel shaft 20 includes a central casting 38 having three radially extending and axially spaced apart carousel support plates 40,42,44 thereon, FIGS. 4-6. Each support plate 40,42,44 includes multiple sets (only one shown for plates 42,44) of tie-bar receiving apertures 40a,40b,40c, 42a,42b,42c and 44a,44b,44c radially disposed and circumferentially spaced therearound. The apertures 40a,42a,44a are coaxial as are the apertures 40b,42b,44b and 40c,42c,44c. The central casting 38 is secured on the carousel shaft 20 by collars 87 and machine screws 39.

The carousel support plates 40,42,44 provide support means for supporting the mold stations 12 in radially disposed and circumferentially spaced apart relation on the carousel shaft 20.

Each mold station 12 carried on the carousel support plates 40,42,44 is identical and only one mold station 12 will be described in detail hereafter.

In particular, with reference to FIGS. 1-3 and 7-9, each mold station 12 includes multiple sets of tie-rods 50,52,54 which are received in the coaxial apertures 40a,42a,44a; 40b,42b,44b and 40c,42c,44c, respectively, of the support plates 40,42,44. In particular, the tie rods 50,52,54 are slidably mounted in sets of bushings disposed in the apertures 40a,40b,40c; 42a,42b,42c and 44a,44b,44c. A ball bushing 55 and pair of ball bushings 57 slidably support the tie rod 54 on the respective carousel support plates 42,44 and resist bending forces on the tie rods at those locations. Ball bushings 59 slidably support each tie rod 50,52 on the respective carousel support plates 42,44. A set of outboard sleeve bushings 61 also support the tie rods 50,52 and 54, respectively, and are located to resist bending forces on the tie rods.

At each mold station 12, the tie-rods 50,52 are spaced laterally apart on the same lateral plane (i.e., the tie-rods 50,52 are substantially coplanar) whereas the tie-rod 54 is spaced intermediate the tie-rods 50,52 and displaced toward the axis of revolution R of the carousel shaft 20. A triangular pattern of tie rods 50,52,54 is thus provided when viewed from the end of the carousel shaft 20; e.g., see FIGS. 2,3.

Each mold station 12 includes a first pressure plate 56 and second pressure plate 58 mounted on the tie rods 50,52,54 adjacent opposite ends thereof. The first pressure plate 56 is mounted on the tie-rods 50,52,54 by a split ring 60 disposed in an undercut on the respective tie rods on one side of the pressure plate 56 and a respective threaded nut 64 on the other side of the pressure plate 56. The tie-rods 50,52,54 include threaded portions beneath the nut 64 for this purpose. Similarly, the second pressure plate 58 is mounted on the tie rods 50,52,54 by a split ring 62 on one side thereof and a threaded nut 66 on the other side thereof. Thus, the pressure plates 56,58 are mounted a fixed distance apart on the tie bars 50,52,54.

Each mold station 12 further includes mold sections 12a,12b comprising a first mold platen 70 and a second mold platen 72 mounted on the tie rods 50,52,54 for relative movement and molds 71,73 secured and carried on the respective mold platen 70,72. As mentioned hereinabove, the mold sections 12a,12b of each mold station 12 are openable and closeable as they are rotatably indexed. Opening and closing of the mold sections 12a,12b is effected by a hydraulic cylinder means 76 disposed between the first mold platen 70 and the first pressure plate 56, FIGS. 8-9. In particular, the hydraulic cylinder means 76 includes a cylinder 76a attached to the first mold platen 70 by trunnion 80 and a reciprocable piston 76b attached to an upstanding extension 56a of the pressure plate 56 by a trunnion 82. Actuation of hydraulic cylinder means 76 produces equal and opposite movement of the mold platens 70,72 and the molds 71,73 thereon toward or away from one another as will become apparent.

The second mold platen 72 is attached to an upstanding extension 58a of the pressure plate 58 by a trunnion 83. The second mold platen 72 and mold 73 thereon thus are moveable with the second pressure plate 56 which is movable with the tie rods 50,52,54 when the hydraulic cylinder means 76 is actuated. The second mold platen 72 includes oversized bores therethrough to accommodate the tie rods 50,52,54 extending therethrough.

The first mold platen 70 is supported on an enlarged, integral carriage portion 70a which is slidably mounted on the tie rods 50,52,54 by a set of ball bushings 100.

The first and second mold platens 70,72 are caused to move synchronously between the open and closed positions by the synchronizing mechanism 110 mounted on the carousel support plate 42. The synchronizing mechanism 110 includes a coupling lever 112 which is rotatable about a pivot shaft 114. The pivot shaft 114 is received and secured on the carousel support plate 42. One end 112a of the coupling lever 112 is connected by a drag link 116 to the carriage portion 70a of the mold platen 70 and the other end 112b is connected by a drag link 118 to the pressure plate 56.

When the hydraulic cylinder means 76 is energized to open the mold sections 12a,12b, the piston 76b is moved toward and into the cylinder 76a and the mold platen 70 is moved toward the pressure plate 56. The synchronizer 110 causes the pressure plate 56 and the tie rods 50,52,54 to be pulled to the right in FIGS. 8-9 to cause the pressure plate 58 affixed on the tie rods to be moved away from the pressure plate 56. When the hydraulic cylinder means 76 is energized to close the mold sections 12a,12b, the reverse movement of the pressure plates 56,58 and platens 70,72 occurs. Thus, actuation of hydraulic cylinder means 76 produces equal and opposite movement of the mold platens 70,72 and the molds 71,73 carried respectively thereon.

When the mold sections 12a,12b are closed and clamp pressure is applied by the hydraulic cylinder means 76, the tie rods 50,52 are placed in tension and the tie rod 54 is placed in compression. In this situation, there is a tendency to bend the tie rods. The trunnions 80, 82 and 83 allow relative pivotal motion of the mold platens 70,72 from these bending forces to maintain the platens 70,72 parallel to one another. Without the trunnions 80, 82 and 83, there would be a tendency by reason of the bending stresses for the mold platens 70,72 and hence the mold sections 12a,12b secured thereon to move out of parallel.

Figure 11:
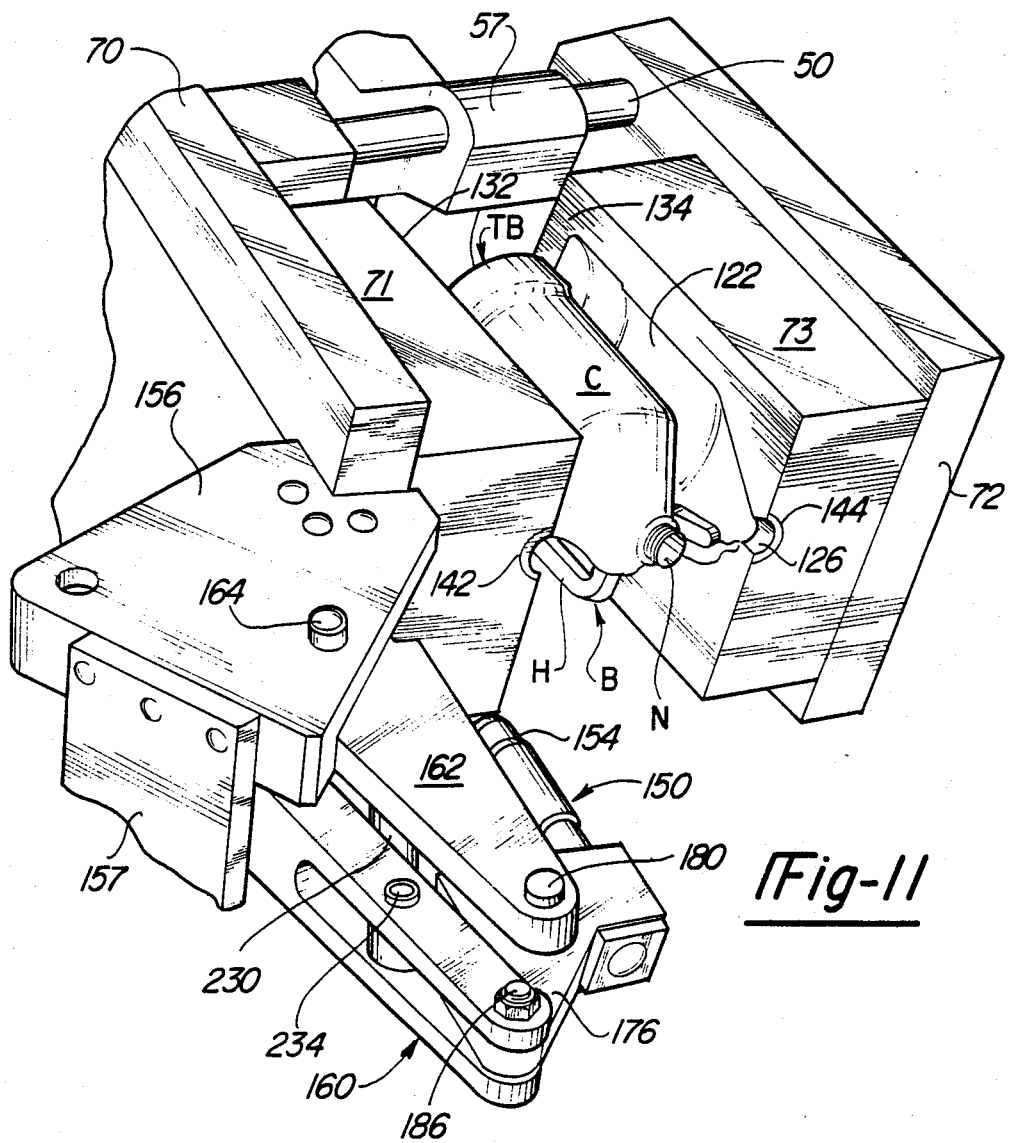
FIG. 11 is an enlarged, partial perspective view of a mold station with the blowing mechanism retracted.

As shown best in FIGS. 7-12, the molds 71,73 each include contoured, inner surfaces 120,122 that define, when the molds 71,73 are closed and mated at the parting plane M, a blowing cavity 124 and a mold mouth 126 extending from the blowing cavity 124 to the exterior surfaces 128,130 on the mold sections 12a,12b, respectively. The blowing cavity 124 is shaped to impart the desired bottle shape to the parison T when the parison is blown in the blowing cavity 124 as will be described hereinbelow. A typical bottle B produced by blowing the parison T in the blowing cavity 124 is shown in FIG. 11 as including a threaded bottle neck N, handle H and container C.

The mold mouth 126 extends from the blowing cavity 124 and opens outside the closed molds 71,73 so as to receive a blow pin 150 of a blowing/neck finishing mechanism 152 after the parison T is captured between the mold sections 12a,12b of each mold station 12 as will be explained hereinbelow.

The parison T is captured by closing the molds 71,73 of the mold sections 12a,12b onto the parison as it is extruded therebetween at position P1. When the mold sections 12a,12b are closed onto the tubular parison T at position P1, the bottom portion TB of the parison T is pinched and closed by pinch surfaces 132,134 on the molds 71,73 and the top TT of the parison T is received in the mold mouth 126 as shown in FIGS. 10 and 12.

Figure 12:
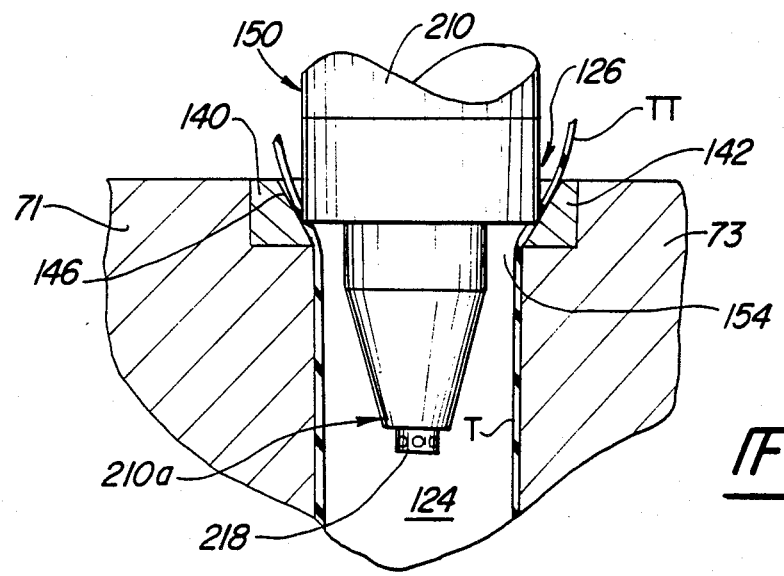
FIG. 12 is an enlarged partial sectional view of the encircled portion of FIG. 10.

The mold mouth 126 is formed by a pair of strike inserts 140,142 that are received in counterbores in the mold plates 71,73 and that together form an annular strike member 144 when the mold sections 12a,12b are closed, FIGS. 10 and 12. The annular striker member 144 so formed includes a truncated conical inner surface 146 on which the top TT of the parison T is received as shown in FIG. 12.

When the blow pin 150 is inserted in the mold mouth 126, an annular shear ring surface 154 on the blow pin pinches and cuts (trims) the top TT of the parison T as shown in FIG. 12.

Each blowing/neck finishing mechanism 152 includes a pair of spaced apart, side-by-side support members 156 that are fastened together by upper connector plate 157 and lower connector plate 159. The lower connector plate 159 is fastened on the first mold platen 70 by multiple machine screws 158. Mounted between the support members 156 is a pivotal linkage 160. The linkage 160 includes a bellcrank arm 162 that is pivotally mounted between the support members 156 by a pivot pin 164. The aft end 162a of the bellcrank arm 162 is connected to the output piston 168 of a fluid cylinder 170 by a pivot pin 172. The cylinder 170 is secured between the support members 156 by a mounting block 173 affixed between the support members 156. The forward end 162b is connected to a blow pin support plate 176 by pivot pin 180.

The pivotal linkage 160 also includes a second link 182 pivotally mounted between the support members 156 by pivot pin 184 and pivotally connected to the blow pin support plate 176 by a pivot pin 186. It is apparent a straight line extending through the pivot axes defined by pivot pins 184,186 is substantially parallel to a straight line extending between pivot pin 164 and pivot pin 180. Second link 182 thus is substantially parallel to bell crank arm 162 and functions to maintain the longitudinal axis LB of the blow pin 150 substantially parallel to the longitudinal axis LM of the mold mouth 126 at all times.

FIG. 10 illustrates the blow pin 150 in the retracted position RB where the blow pin is offset from the longitudinal axis LM of the mold mouth 126 and in the operative blowing position I where the blow pin 150 is inserted in the mold mouth 126 with the top TT of the parison T pinched between the annular shear surface 154 of the blow pin and the annular strike member 144 of the mold mouth 126.

The blow pin 150 includes a cylindrical threaded body 200 secured on the blow pin support plate 176 by opposing nuts 204,206. An internally threaded tip body 210 is threadably received on the cylindrical body 200 and secured in position thereon by a lock nut 212. The cylindrical body 200 includes an end fitting 214 onto which an air line fitting (not shown) is attached for supplying blowing air. The cylindrical body 200 includes a longitudinal bore therethrough that registers with a longitudinal bore in the tip body 210 to conduct the blowing air from the fitting 214 to the blow pin tip 210a for discharge through multiple, circumferential apertures 218 in the blow pin tip 210a.

The pivotal linkage 160 is designed to move the blow pin 150 along an arcuate (circular arc) path from the retracted position RB shown in phantom in FIG. 10 to the operative inserted position I in the mold mouth 126 with the longitudinal axis LB of the blow pin substantially parallel with the longitudinal axis LM of the mold mouth 126. Importantly, the location of the pivots of the linkage 160 as well as distances between the pivots is selected to provide for minimum arcuate travel of the blow pin 150 as it approaches and is inserted in the mold mouth 126 along a path that is as straight as possible. In particular, with reference to FIG. 13, the pivotal linkage 160 moves the blow pin 150 from the left side of the longitudinal axis LM of the mold mouth 126 to an initial centered position where the longitudinal axis LB of the blow pin is substantially coaxial with axis LM, then offset slightly on the right side thereof and finally from the right side to a coaxial relation with the longitudinal axis LM as the blow pin 150 approaches and is inserted and centered in the mold mouth 126.

Figure 13:
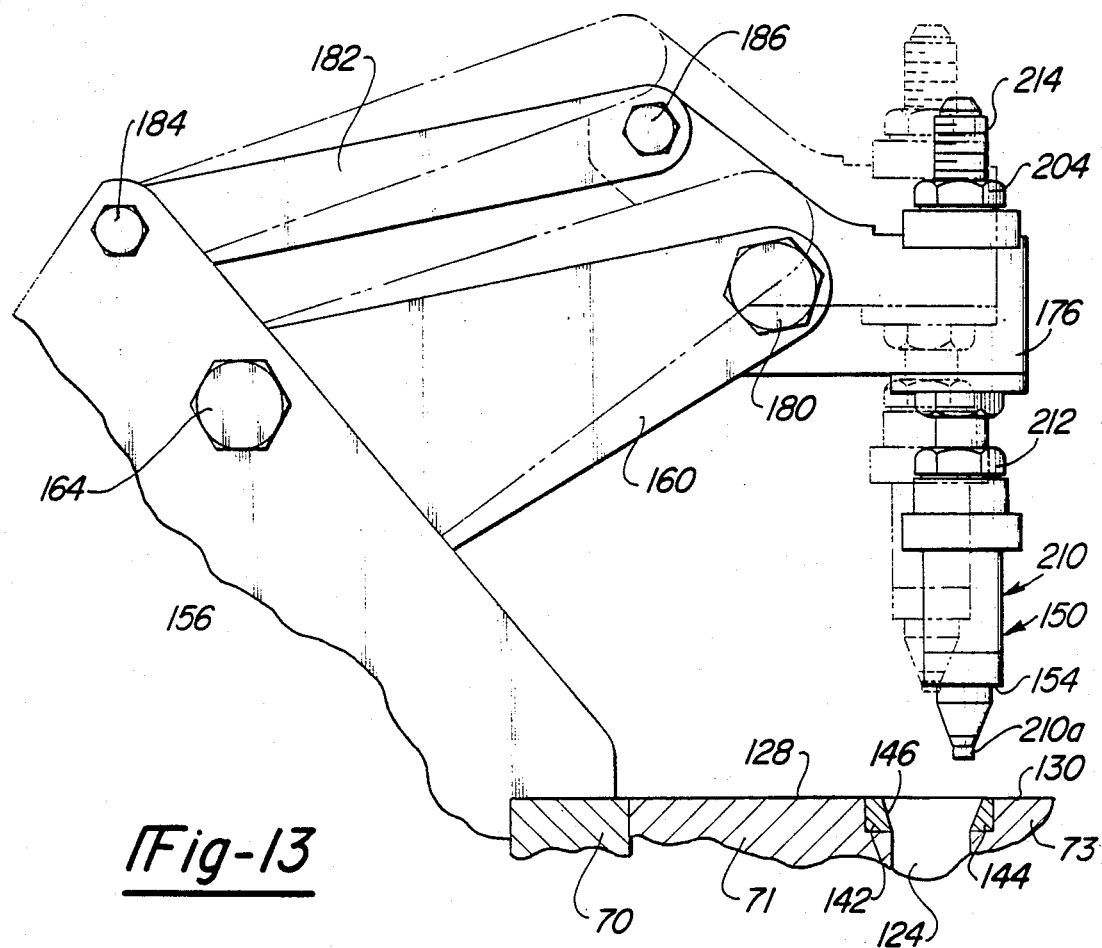
FIG. 13 is similar to FIG. 10 with the blow pin shown approaching the mold mouth.
Figure 14:
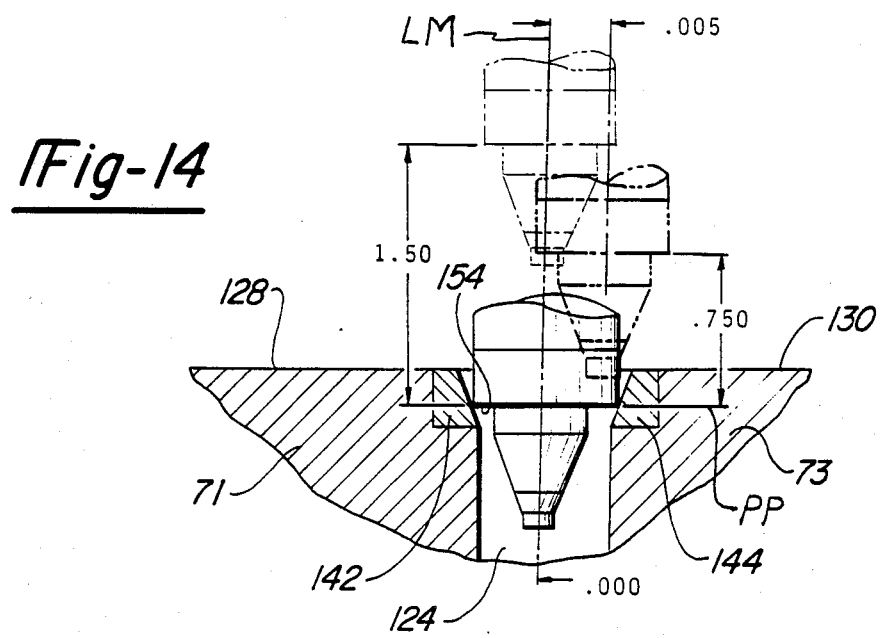
FIG. 14 is similar to FIG. 12 and shows different positions of the blow pin as it approaches and enters the mold mouth.

The first centered position of the blow pin 150 coaxial to the longitudinal axis LM in FIGS. 13-14 begins about 1.5 inches above the contact plane PP shown in FIG. 14. The blow pin 150 reaches its maximum rightward (offset) travel about 0.75 inch above the contact plane PP. During the next 0.75 inch of vertical travel toward the mold mouth 126, the blow pin 150 moves from right to left (in FIG. 14) toward the longitudinal axis LM until it is seated against the striker member 144 in the mold mouth 126 at contact plane PP substantially coaxial with the longitudinal axis LM of the mold mouth 126.

As shown in FIGS. 13-14, at the initiation of the cross-over of the blow pin 150 from left to right relative to the longitudinal axis LM, the blow pin 150 is coaxial with the longitudinal axis LM. At the end of the left to right cross-over, the blow pin 150 is offset to the right of the longitudinal axis LM by about 0.005 inch of travel. The blow pin 150 is then moved from right to left by 0.005 inch to center the blow pin in the mold mouth 126 coaxial with axis LM. By moving the blow pin 150 in this manner substantially equal but opposite amounts, the net arcuate travel of the blow pin as it approaches and is inserted the mold mouth 126 is minimized to provide as straight a path of movement as possible.

An L-shaped stripper member 230 is pivotally mounted on and between the bellcrank arm 112 and secondary link 182 by pivot screws 232,234. The stripper member 230 includes a bifurcated or forked end 236. As shown in FIG. 10, the blow pin 150 and forked end 236 are relatively aligned to permit the blow pin 150 to extend through the slot 236a in the forked end when the blow pin is inserted in the mold mouth 126.

The forked end 236 is dimensioned to also straddle the top of the parison T and to remove the cut off top TT of the parison T when the blow pin 150 is moved from the operative blowing position I to the retracted position RB after the parison T is blown to shape in the blowing cavity 124. As mentioned hereinabove, the top TT of the parison T is cut off by the shear ring 154 of the blown pin 150 in cooperation with the strike member 144 in the mold mouth 126. The cut off top TT of the parison T removed by the stripper member 230 when the blow pin is retracted falls by gravity into a receptacle (not shown).

The carousel shaft 20 is driven in incremental rotation by an electric motor 250 mounted on the upstanding end 16a of the base 16. The output shaft 252 of the electric motor 250 enters a gear reducer 253. The output shaft 254 of the gear reducer drives a conventional rotary indexer 256 of known type (e.g., available from Camco Corp.). The rotary indexer 256 is affixed on the upstanding end 16b of the base 1 and drives the carousel shaft 20 in incremental rotation to rotatably index the mold stations 12 on the rotary carousel 14.

It is apparent from FIGS. 1-3 that the rotary carousel 14 carries six mold stations 12 which are identical and constructed as described hereinabove. The rotary carousel is indexed in 60° increments of rotation by the indexer 256 to place each mold station 12 at the six successive angular positions or stations P1-P6.

At the first angular station or position corresponding to the parison extruding station P1, the overhead extruder head 26 extrudes the tubular parison T between the mold sections 12a,12b which are held open at the station P1 by the hydraulic cylinder means 76. When the parison T is fully extruded, the mold sections 12a,12b are closed by the hydraulic motor 76 to capture the extruded parison T. The rotary carousel 14 is indexed counterclockwise 60° in FIG. 2 (clockwise in FIG. 3) to the second angular position P2 so that the next following mold station 12 on the carousel 14 is positioned at the parison capturing position P1 with the mold sections 12a,12b thereof open. As the just closed mold station 12 begins to leave the station P1, the extruder head 26 is rocked upwardly by the cylinder/piston assembly 30. The parison T is severed from the extruder head 26 by engaging an inner mandrel (not shown) in the extruder head against an outer extruder head die (not shown) to cut the parison T therebetween in known manner. This cutting of the parison T in the extruder head 26 is referred to as die closure cutting. Moreover, as shown best in FIGS. 2 and 3, each mold station 12 is positioned at the parison extruding station P1 off of top dead center (relative to a vertical plane through axis of rotation R of the carousel 14) so that there is a vertical component of movement of each mold station 12 as it is indexed from position P1 toward the second angular position P2. This vertical component of motion of each mold station 12 after capturing the parison T maintains parison separation from the extruder head 26 after die closure cutting.

After the parison T is severed from the extruder head 26 and as the closed mold station begins to leave the position P1 after capturing the parison T, the blow pin 150 is inserted into the mold mouth 126 by actuation of linkage 160. When the blow pin is inserted, the shear ring 154 thereon and the annular strike member 144 in the mold mouth cooperate to pinch and cut the top TT of the parison T captured between the closed mold sections 12a,12b.

Once the blow pin 150 is inserted in the mold mouth 126, blowing air is supplied to the blow pin through fitting 214 to blow the thermoplastic parison T to shape in the blowing cavity 124 as the mold station is indexed to the second angular position P2. The blow molded article (i.e., bottle B) is then cured at an elevated temperature with the blow pin 150 inserted in the mold mouth 126 while the mold station is indexed to second, third and fourth angular positions P2,P3,P4. Before each mold station 12 reaches the fifth angular position (corresponding to a take-out position P5), the blow pin 150 is extracted from the mold mouth 126 and returned to the retracted position RB with the stripper member 230 carrying the cut-off top TT of the parison T for disposal and recycling.

At the fifth angular position P5, removal of the blown bottle B from the mold station 12 is initiated by suitable means; e.g., manually after the mold sections 12a,12b are opened by the hydraulic motor 76 or automatically by a suitable take-out mechanism. A preferred take-out mechanism 300 for use with the blow molding machine described hereinabove is shown partially in FIG. 3 and is disclosed in copending application Ser. No. 252,805 entitled "Rotary Blow Molding Machine With Rotary Take-Out Mechanism Having Expandible Take-Out Pin" filed in the names of L. Weber and W. Martin and of common assignee herewith, the teachings of which are incorporated herein by reference. Such a take-out mechanism 300 is shown partially in FIG. 3. The take-out mechanism includes an elongate turret arm 302 which includes an annular collar 304 rotatably mounted on the carousel shaft 20 for relative rotational movement thereon so that the arm 302 rotates about the axis of revolution R of the carousel shaft 20. The elongate arm 302 carries a turret 306 on the outboard end thereof. The turret includes an indexable take-out mechanism 308 with three take-out arms 310 disposed radially and spaced apart circumferentially thereon. Each take-out arm 310 includes an expandible take-out pin 312 (only one shown). In operation, the take-out mechanism 308 is indexed to position one of the take-out arms 310 in alignment with the neck N of the blown bottle B in the closed mold station 12 at the fifth angular position P5. The expandible pin 312 on the aligned arm 310 is then inserted in the bottle neck N and expanded to grip the bottle neck N from the inside. As the mold station 12 is indexed next toward the sixth angular position P6, the elongate turret arm 302 is caused to rotate in synchronism with rotary indexing of the mold station 12, from the solid line position of FIG. 3 toward the phantom position to allow the take-out arm 310 and expanded pin 312 thereon gripping the bottle neck N to follow or track the rotary movement of the mold station 12 as the mold sections 12a,12b are opened by the hydraulic cylinder means 76. When the arm 302 is at the phantom position of FIG. 3, the take-out mechanism 308 is indexed counterclockwise in FIG. 3 to remove the bottle B from between the open mold halves 12a,12b. The elongate turret arm 302 then returns to the solid line position of FIG. 3. The elongate arm 302 is caused to oscillate between the solid line and phantom line positions of FIG. 3 by a crank arm 332 and link 334 pivotably attached on the crank arm and elongate arm 302. The crank arm 332 is in turn driven by a drive shaft 336 of a gear reducer 338. The drive shaft 336 is driven in rotation by an input shaft 337 from a belt and pulley drive 340 including an output pulley 341, tension-controlling pulley 342, driven pulley 344 and a belt 346. Driven pulley 344 is rotated by the output shaft 254 of the gear reducer 253. A detailed description of the take-out mechanism 300 are provided in the aforementioned copending application entitled "Rotary Blow Molding Machine With Rotary Take-Out Mechanism Having Expandible Take-Out Pin".

The sixth angular indexed position P6 of each mold station 12 may be used as an in-the-mold labelling station where a label (not shown) is inserted into the blowing cavity 124 (with the mold sections 12a,12b open) and retained in position in the blow cavity prior to receiving and capturing the extruded parison T at the parison capturing station P1.

In the blow molding machine described hereinabove, hydraulic fluid is supplied from a single, common hydraulic fluid pressure source 350 to each hydraulic cylinder means 76 of each mold station 12 through a rotary joint 352 on the end of the carousel shaft 20. A suitable hydraulic fluid pressure regulator 354 is carried on the rotary carousel 14 and is interconnected between the fluid pressure source 350 and each hydraulic cylinder means 76. A check valve device 356 is also provided on the rotary carousel 14 adjacent the pressure regulator 354. The check valve device 356 is disposed between the fluid pressure source 350 and each hydraulic motor 76 to sustain the clamp pressure supplied to each cylinder 76a at a desired level without continual open circuit pressurization from the fluid pressure source 350. Use of the check valve devices 365 allows a single, common fluid pressure source 350 to serve each hydraulic cylinder means 76 of each mold station and provide adequate fluid pressurization thereto for clamping each pair of mold sections 12a,12b together.

Similarly, hydraulic fluid for the cylinder 170 that actuates the pivotal linkage 160 of the blowing mechanism 152 is supplied from a fluid pressure source 359 through the same rotary joint 352 on the end of the carousel shaft 20.

Regulated pneumatic pressure to the blowpin 150 of each mold station 12 is supplied from a regulated air pressure source 360 through a rotary pneumatic connector 362 on the rotary joint 352.

Figure 2:
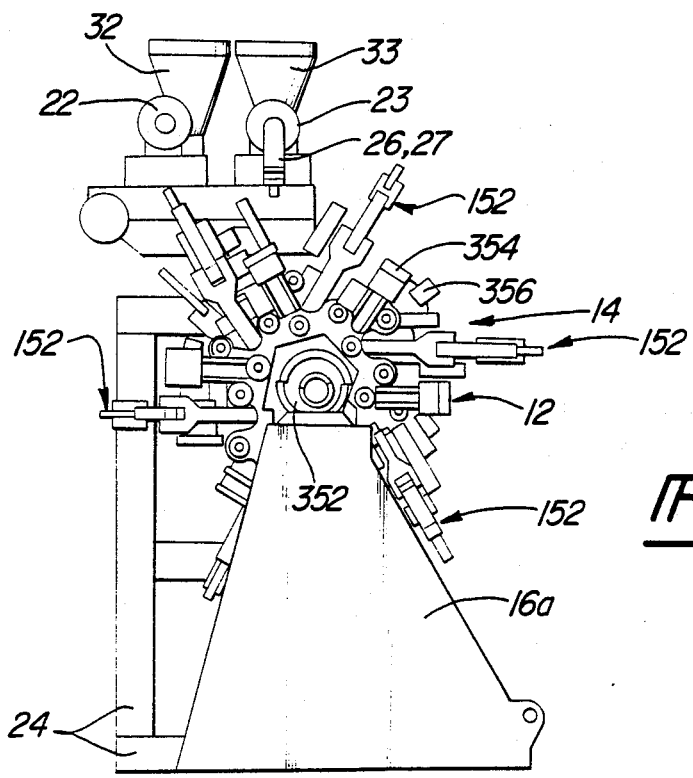
FIG. 2 is an end elevational view of the blow molding machine in the direction of arrow 2 in FIG. 1.
Figure 3:
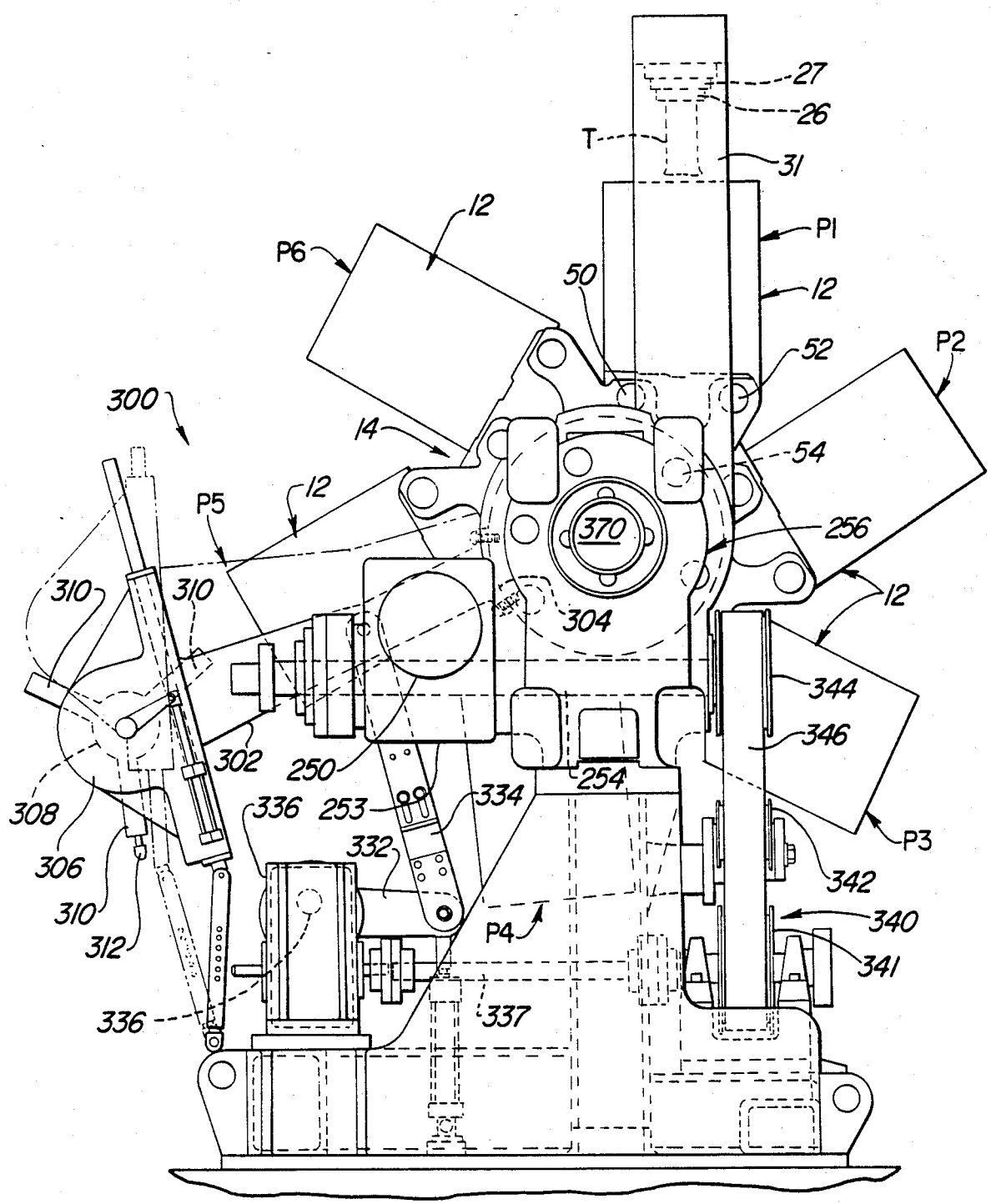
FIG. 3 is an end elevational view of the blow molding machine in the direction of arrow 3 of FIG. 1.
Figure 4:
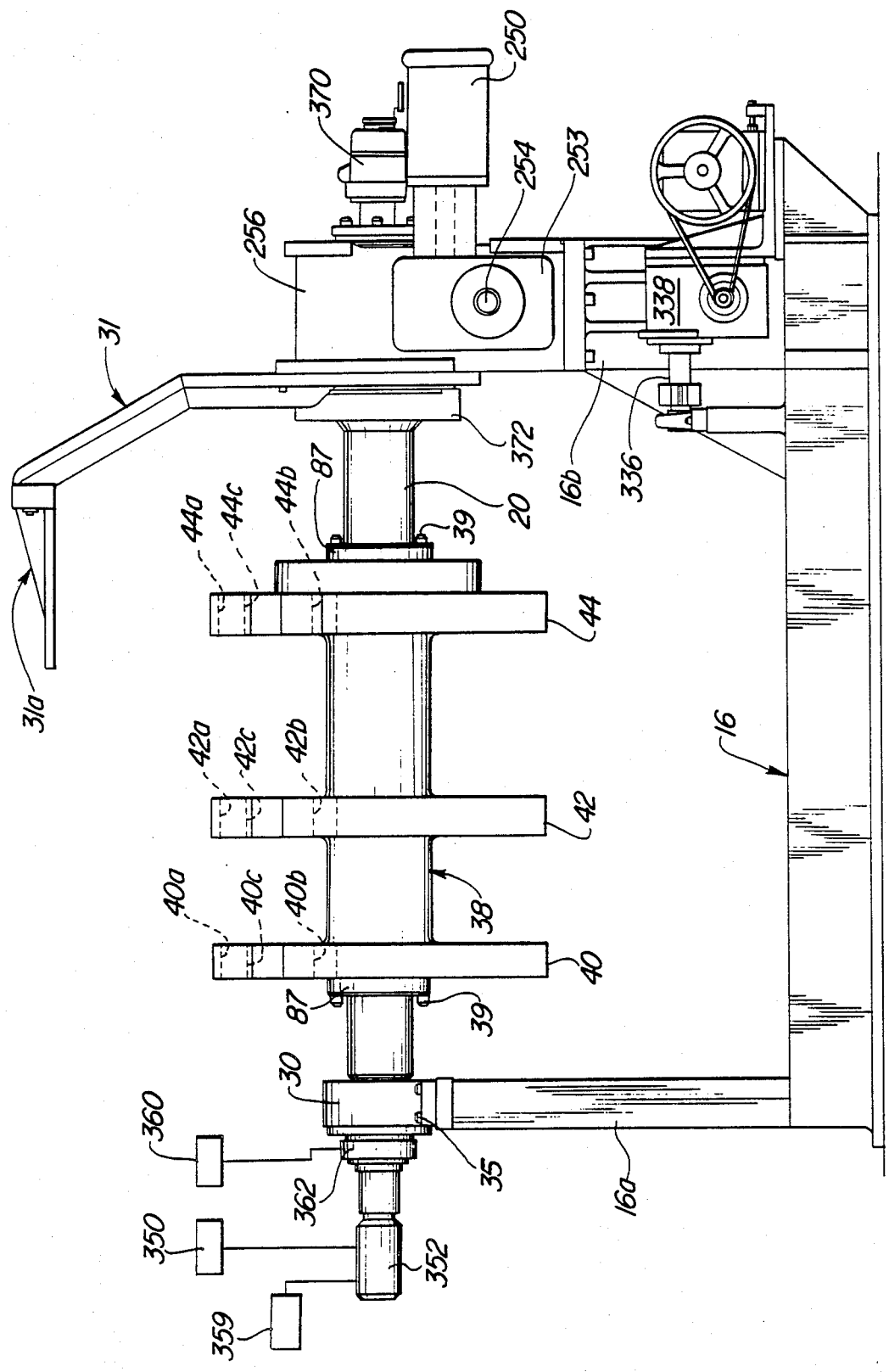
FIG. 4 is a side elevational view of the frame of the blow molding machine.
Figure 5:
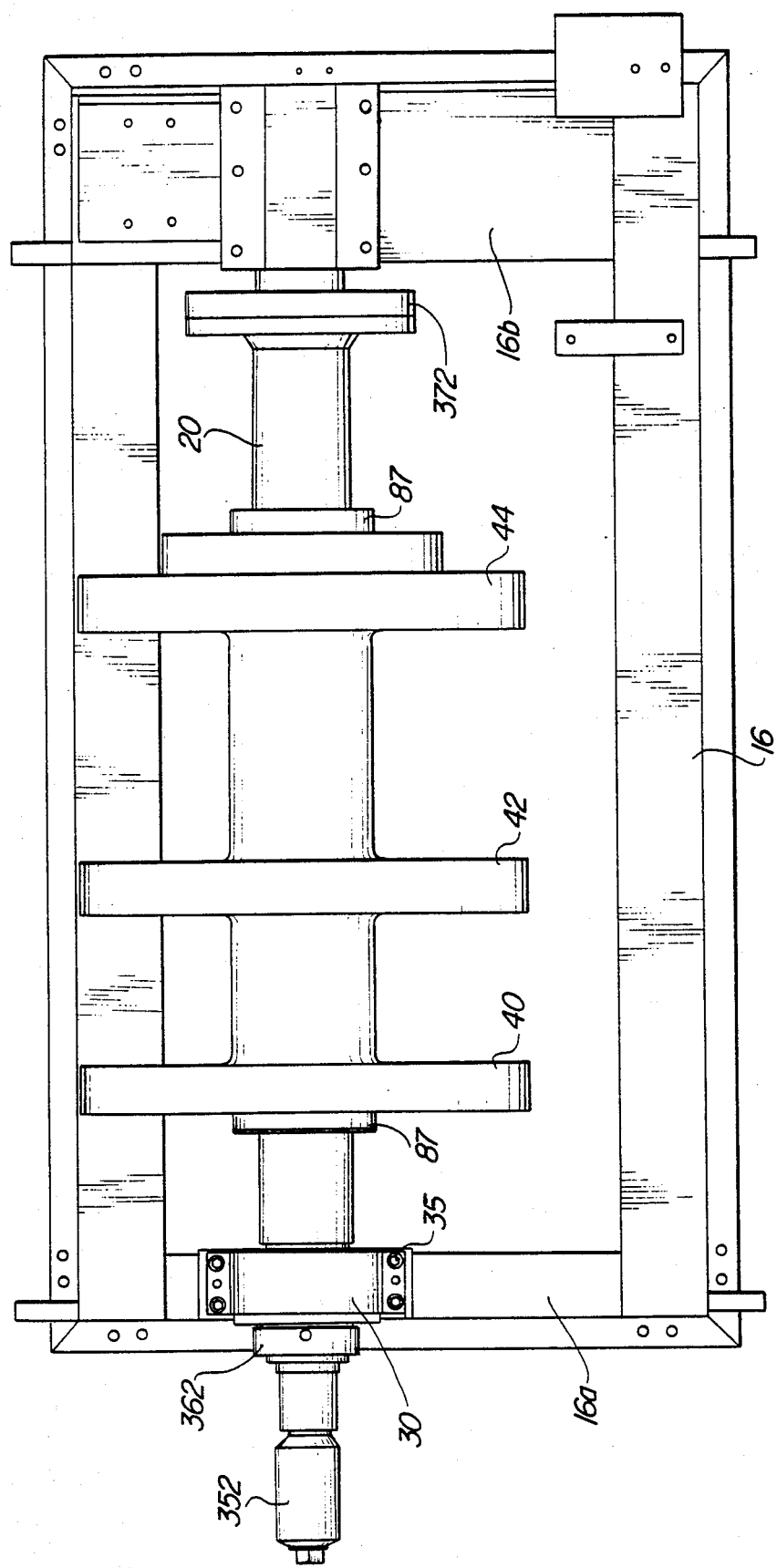
FIG. 5 is a plan view of the frame of the blow molding machine.
Figure 6:
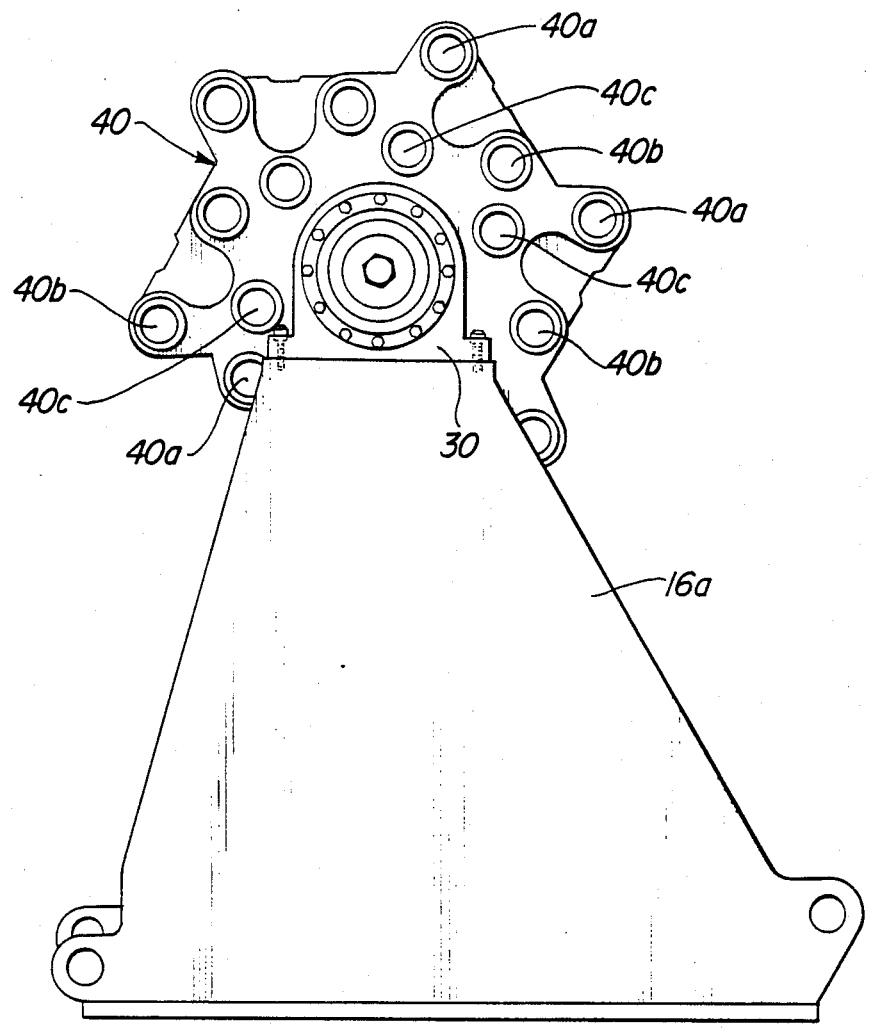
FIG. 6 is an end elevation of the frame of FIG. 4.
Figure 7:
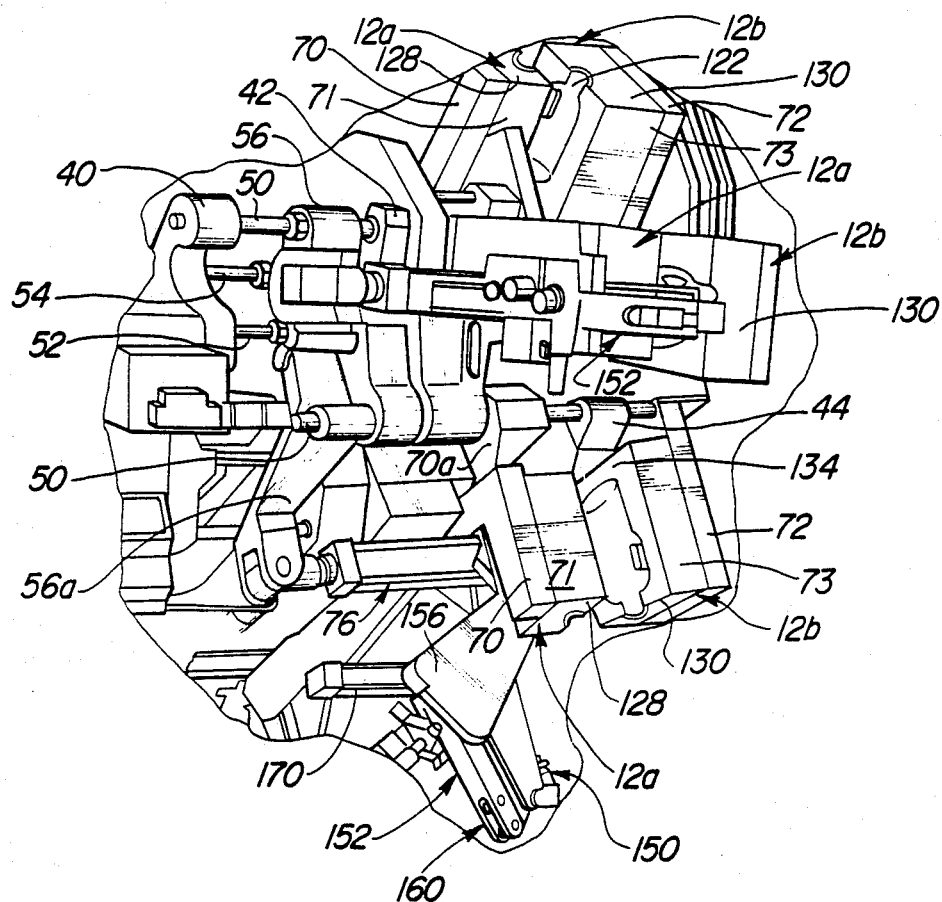
FIG. 7 is an enlarged, partial perspective view of the mold stations on the blow molding machine of FIG. 1.

Hydraulic lines and pneumatic lines between the various components are not shown in FIGS. 1 and 2 for drawing simplification purposes.

Furthermore, brushes (not shown) and slip rings (not shown) are provided on the carousel shaft 20 for electrical connections to the components thereon.

A rotary water union 370 is provided on the end of the carousel shaft 20 to supply cooling water to an annular water manifold 372 carried on the carousel shaft 20. Water conduits (not shown) extend from the manifold 372 to the mold sections 12a,12b of each mold station 12 on the rotary carousel 14. The mold sections 12a,12b of each mold station 12 include internal cooling passages (not shown) through which cooling water is flowed to maintain the temperature of the mold sections 12a,12b at the desired value.

While the blow molding machine of the invention has been described as having six mold stations 12, those skilled in the art will appreciate that other numbers of mold stations, e.g. four and eight mold stations, can be used.

While the invention has been described in terms of specific embodiments thereof, it is not intended to be limited thereto but rather only to the extent set forth hereafter in the following claims.

We claim:

1. A rotary blow molding machine comprising:
   (a) a base,
   (b) a carousel rotatably supported on the base,
   (c) means for rotating the carousel,
   (d) a plurality of mold stations carried on the carousel in circumferentially spaced apart relation thereon, said mold stations each comprising a pair of mold sections openable and closeable to define, when closed, a blowing cavity and a mold mouth communicating with the blowing cavity and opening outside the closed mold sections, and
   (e) blowing mechanism cooperatively associated with each mold station, said blowing mechanism having a blow pin movable between a retracted position external of the mold mouth and a blowing position inserted in the mold mouth, means for moving the blow pin in an arcuate path from the retracted position to the blowing position to insert the blow pin in the mold mouth to blow a parison received in the blowing cavity and from the blowing position to the retracted position to withdraw the blow pin from the mold mouth, and means for supplying fluid pressure to the blow pin at the blowing position.

2. The machine of claim 1 wherein the carousel is rotatably supported for rotation about a horizontal axis of rotation.

3. The machine of claim 1 wherein the longitudinal axis of the mold mouth is normal to the axis of rotation of the carousel.

4. The machine of claim 2 wherein the blow pin includes a longitudinal axis that is substantially parallel to the longitudinal axis of the mouth.

5. The machine of claim 1 wherein the blow pin and the mold mouth include cooperative means for cutting a portion of the parison in the mold mouth when the blow pin is inserted therein.

6. The machine of claim 5 wherein the cooperative means in the mold mouth includes an annular strike member in the mold mouth and over which a portion of the parison extends and the cooperative means on the blow pin includes an annular shear surface to cooperate with the strike member upon insertion of the blow pin in the mouth to pinch and cut the parison in said mouth to provide a cut-off portion for removal.

7. The machine of claim 6 wherein the blowing mechanism includes stripper means disposed on said means for moving the blow pin and movable therewith for removing the cut-off portion of the parison from the mold mouth when the blow pin is withdrawn therefrom.

8. The machine of claim 1 wherein said means for moving the blow pin moves the blow pin with the longitudinal axis of the blow pin substantially parallel with the longitudinal axis of the mold mouth and with minimized arcuate travel as the blow pin approaches the mold mouth.

9. The machine of claim 8 wherein said means for moving the blow pin moves the blow pin on one side of the longitudinal axis of the mold mouth and then on the other side of the longitudinal axis of the mold mouth as the blow pin approaches and enters the mold mouth.

10. The machine of claim 9 wherein said means for moving the blow pin comprises a pivotal linkage mounted on the mold station.

11. The machine of claim 10 wherein said pivotal linkage includes a pair of parallel pivot links.

12. The machine of claim 11 wherein one of said pivot links comprises a bellcrank.

13. The machine of claim 12 including a fluid cylinder connected to the bellcrank to pivot said first link and said bellcrank.

14. A rotary blow molding machine comprising:
   (a) a base,
   (b) a carousel rotatably supported on the base,
   (c) means for rotating the carousel,
   (d) a plurality of mold stations mounted on the carousel in circumferentially spaced apart relation thereon, said mold stations each comprising a pair of mold sections closeable and openable by movement toward and away from one another and defining, when closed, a blowing cavity and a mold mouth communicating with the blowing cavity and opening outside the closed mold sections, and
   (e) a blowing mechanism cooperatively associated with each mold station and disposed on one of said mold sections for movement therewith toward or away from the other of said mold sections as they are opened and closed, said blowing mechanism having a blow pin movable between a retracted position offset from the mouth external thereof and a blowing position inserted in the mouth, pivotal linkage means mounted on said one of said mold sections and operably connected to the blow pin for moving the blow pin in an arcuate path between the retracted position and blowing position, means for actuating the linkage means to move the blow pin, and means for supplying fluid pressure to the blow pin at the blowing position.

15. The machine of claim 14 wherein the carousel is rotatably supported for rotation about a horizontal axis.

16. The machine of claim 14 wherein the blow pin and mold mouth include cooperative means for cutting a portion of the parison in the mold mouth when the blow pin is inserted therein.

17. The machine of claim 16 wherein the cooperative means in the mold mouth includes an annular strike member in the mold mouth and over which a portion of the parison extends and the cooperative means on the blow pin includes an annular shear surface to cooperate with the strike member upon insertion of the blow pin in the mold mouth to pinch and cut the parison in said mold mouth to provide a cut-off portion for removal.

18. The machine of claim 17 wherein the blowing mechanism includes stripper means disposed on the pivotal linkage means and movable therewith for removing the cut-off portion of the parison from the mold mouth when the blow pin is withdrawn from the mold mouth.

19. The machine of claim 14 wherein the pivotal linkage means moves the blow pin on one side of a longitudinal axis of the mold mouth and then on the other side of the longitudinal axis of the mold mouth with the longitudinal axis of the blow pin substantially parallel with the longitudinal axis of the mold mouth as the blow pin approaches the mold mouth.

20. The machine of claim 19 wherein the pivotal linkage means inserts the blow pin in the mold mouth coaxially aligned with the longitudinal axis of the mold mouth.

21. The machine of claim 19 wherein the pivotal linkage means comprises a first and second parallel links pivotally mounted on said one of the mold sections about respective spaced apart pivot axes and pivotally mounted on the blow pin about other respective spaced apart pivot axes.

22. The machine of claim 21 wherein the blow pin is moved in a circular arc about the pivot axis of one of said first and second links on said one of the mold sections.

23. The machine of claim 21 wherein one of said first and second links comprises a bellcrank.

24. The machine of claim 23 wherein said actuating means is operably connected to the bellcrank to rotate the bellcrank about its pivot axis on said one of the mold sections.

25. The machine of claim 24 wherein said actuating means comprises a fluid piston operably connected to the bellcrank.

26. The machine of claim 14 wherein each mold station further includes means on the carousel for moving the mold sections toward and away from one another in substantially equal and opposite amounts.

* * * * *

UNITED STATES PATENT AND TRADEMARK OFFICE
CERTIFICATE OF CORRECTION

PATENT NO. : 4,919,607

DATED : April 24, 1990

INVENTOR(S) : M. Warren Martin et al.

It is certified that error appears in the above-identified patent and that said Letters Patent is hereby corrected as shown below:

Col. 1, line 31, delete "the moves" and insert
        --they move-- therefor.

Col. 8, line 27, after "inserted" insert
        --in-- therefor.

Col. 10, line 66, delete "365" and insert
        --356-- therefor.

Signed and Sealed this

Twenty-second Day of June, 1993

Attest:

MICHAEL K. KIRK

Attesting Officer

Acting Commissioner of Patents and Trademarks